United States Patent [19]

Stitch

[11] 4,088,898
[45] May 9, 1978

[54] ROTATING OPTICAL FREQUENCY CHIRP DEVICE

[75] Inventor: Malcolm Lane Stitch, Kennewick, Wash.

[73] Assignee: Jersey Nuclear-Avco Isotopes, Inc., Bellevue, Wash.

[21] Appl. No.: 729,893

[22] Filed: Oct. 6, 1976

[51] Int. Cl.² ............................................. H03F 7/00
[52] U.S. Cl. .............................. 307/88.3; 356/106 LR
[58] Field of Search ................. 307/88.3; 356/106 LR

[56] References Cited

U.S. PATENT DOCUMENTS 3,611,182  10/1971  Treacy ............................. 331/94.5 C Primary Examiner—Rudolph V. Rolinec
Assistant Examiner—Darwin R. Hostetter
Attorney, Agent, or Firm—Weingarten, Maxham & Schurgin

[57] ABSTRACT

A system for generating pulses of laser radiation which vary in frequency with time to achieve a "chirp" or frequency sweep. In a preferred embodiment, a variable-thickness, rapidly rotating disk of optically-dense material is placed in the optical loop of an injection-locked oscillator. Rotation of the disk in the optical loop of the injection-locked oscillator varies the loop optical path length, resulting in a frequency chirp. By appropriately choosing the shape of the optically dense material, a desired linear output chirp may be obtained.

24 Claims, 3 Drawing Figures

ROTATING OPTICAL FREQUENCY CHIRP DEVICE

FIELD OF THE INVENTION

The present invention is concerned with providing frequency chirps of electromagnetic radiation from single frequency radiation pulses, and more particularly providing time varying frequency output pulses from an injection-locked laser oscillator.

BACKGROUND OF THE INVENTION

Nearly all fission reactions utilizing the uranium isotope $U_{235}$ require a concentration of the $U_{235}$ isotope greater than in the naturally occuring state. U.S. Pat. No. 3,772,519 for METHOD AND APPARATUS FOR THE SEPARATION OF ISOTOPES by R. H. Levy et al. discloses a method for isotope separation in which an environment containing a plurality of uranium isotopes is irradiated with laser radiation of a particular frequency to selectively excite the particles of the desired isotope type, which selectively excited particles may then be separated as disclosed in the patent. For optimum efficiency, the laser isotope separation process, as taught in the Levy patent, prefers excitation radiation with energy distributed throughout the bandwidth of absorption structure of the $U_{235}$ component of uranium vapor rather than the series of discrete mode frequencies typical of most laser radiation.

One way of achieving the even energy distribution is to "chirp" or sweep the frequency of the laser radiation, moving the spectral lines so that all portions of the $U_{235}$ absorption band are subject to resonant frequency laser radiation. Representative methods of producing such a chirp are shown in U.S. Pat. No. 3,611,182 and U.S. patent application Ser. No. 483,077 filed June 25, 1974 and assigned to the same assignee as the present application.

SUMMARY OF THE INVENTION

In accordance with the teaching of the present invention, a system is provided for generating pulses of laser radiation varied in frequency with time to achieve a "chirp" or frequency sweep. This results in moving the line spectra of the laser pulse emission so as to distribute the radiation energy across the entire bandwidth within the emission band which is typically limited for isotopically selective excitation.

In a preferred embodiment, a rapidly rotating disk of optically-dense material is placed in the optical loop of an injection-locked oscillator. The shape of the disk is such that the thickness thereof is a function of the disk angular position. By rotating this disk in the optical loop of the injection-locked oscillator, the output frequency of the oscillator will be perturbed, resulting in a frequency chirp. By appropriately choosing the shape of the optically dense material, a desired linear output chirp may be obtained with very low loss of energy occurring from the operation of the frequency sweeping components.

DESCRIPTION OF THE DRAWINGS

These and other advantages of the present invention are more fully set forth below in the following detailed description and in the accompanying drawing, of which.

DETAILED DESCRIPTION OF THE INVENTION

Figure 1:
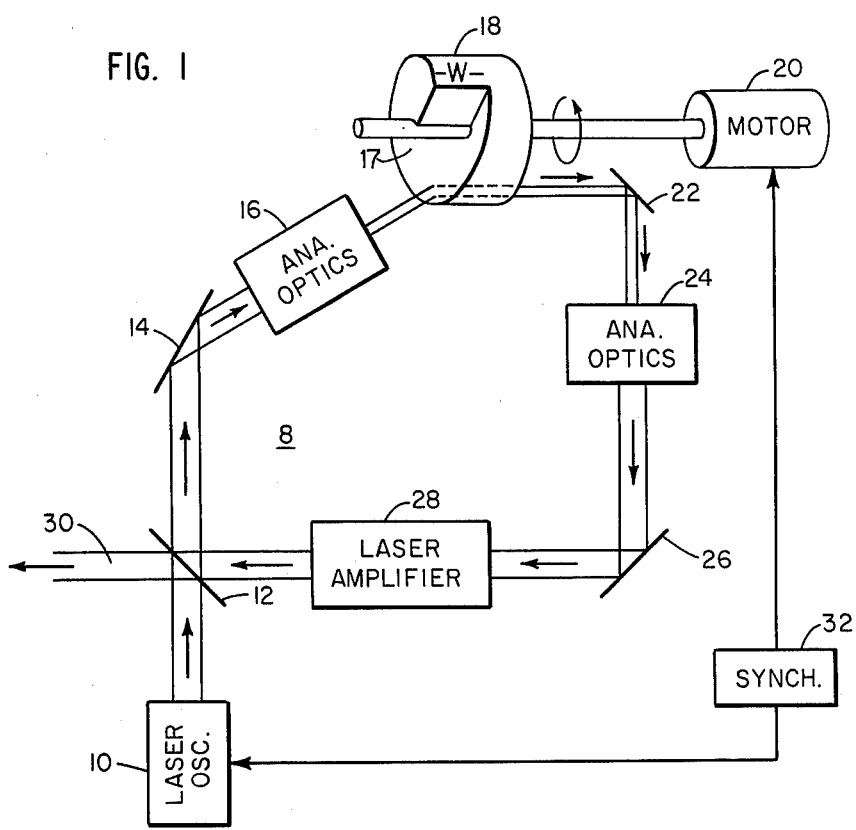
FIG. 1 is a diagram of an injection-locked oscillator incorporating the invention.

Referring to FIG. 1, there is shown the method by which the present invention produces output pulses of laser radiation of time-varying frequency from an injection-locked oscillator 8 (ILO). A laser oscillator 10 produces an output beam of laser radiation. This beam is typically composed of individual pulses of laser radiation but may be a continuous CW beam of radiation, as will become apparent as the invention is explained. The beam from laser oscillator 10 passes through an input and output coupling mirror 12 which typically passes 50% of the incident radiation and reflects the remaining 50%. The beam passing through coupling mirror 12 is reflected by another mirror 14 to pass through anamorphic beam-reducing optics 16. Anamorphic optics 16 is oriented to compress the cross-sectional size of the beam of laser radiation in the plane of the drawing as it passes through for reasons described below.

The output beam from the anamorphic optics 16 impinges upon a helical, end surface 17 of a rotating disk 18, as shown in FIG. 1. Rotating disk 18 is made up of an optically dense transparent material such as quartz having an index of refraction different from that of the surrounding environment through which the beam of radiation passes. Disk 18 is rotated about its axis by a motor 20 or other suitable mechanism. As shown in FIG. 1, the surface 17 through which the laser radiation enters the disk 18 is helically-shaped and the surface from which the beam of radiation exits is typically planar and perpendicular to the axis of rotation. The result of this shape is that as disk 18 is rotated about its axis, the laser radiation passing therethrough passes through a time-varying thickness of the disk material, effectively changing the length of the optical path which the laser radiation must traverse. In the orientation shown, the path length through the disk increases with time.

It should be noted that while the path of the beam emerging from the planar face of disk 18 moves slightly with rotation of the disk, as can be seen from FIG. 1, the angle at which the beam emerges is constant. This is an important advantage of the present invention when used in a laser enrichment process, such as that described in the Levy et al. patent cited above, since the laser beam in such a process must traverse a considerable length and small changes in the position of the beam are much less deleterious than small changes in the angle of the beam.

After passing through rotating disk 18, the beam of laser radiation is reflected by a mirror 22 and passes through anamorphic beam expanding optics 24 which produce an opposite transformation from beam-reducing optics 16 and restore the beam of radiation to its original cross-sectional dimensions. The output beam of radiation from beam-expanding optics 24 is reflected by a mirror 26 through a laser amplifier 28.

Laser amplifier 28 amplifies the radiation beam in a manner to compensate for losses around the loop. One of the important advantages of the present invention is that the frequency sweeping components of the system cause very little loss in the energy of the beam. Losses through anamorphic optics 16 and 24 and the disk 18 are typically less than 1%. This extremely low loss reduces the requirements of amplifier 28 and increases the efficiency of injection-locked oscillator 8.

The output from laser amplifier 28 impinges upon input/output mirror 12 which transmits a fractional part of the incident radiation from laser amplifier 28, as shown by beam 30, to produce an output beam of radiation. Mirror 12 reflects the remaining fraction of the beam from laser oscillator 10 to a mirror 14 for circulation around the loop.

It can be seen that as disk 18 rotates, the optical path length around the closed loop of injection-locked oscillator 8 is varied, due to the time-varying thickness of disk 18 through which the radiation must pass. As described in greater detail below, this varying of the optical path length produces a corresponding change in frequency in the radiation traveling around the closed path of injection-locked oscillator 8. Laser oscillator 10 may be either a continuous laser or may be a pulsed laser with one or more pulses per revolution of disk 18. In the case of pulsed operation for laser oscillator 10, it may be desirable, but is not necessary, to synchronize the occurrence of pulses from laser oscillator 10 with the angular position of rotating disk 18. This may be done as shown in FIG. 1 by means of a synchronizing circuit 32 which, in conventional manner, coordinates the production of pulses from laser oscillator 10 with the positioning of rotating disk 18 by motor 20.

Figure 3:
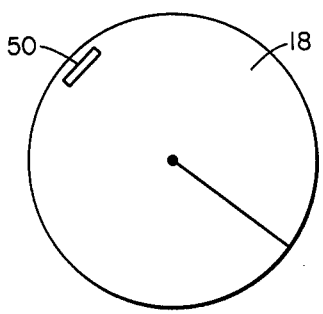
FIG. 3 shows the cross-section of the beam as it passes through the rotating disk of FIG. 1.

It can be seen that the angle of inclination in the circumferential direction of the helical surface 17 of disk 18 decreases with increasing distance from the center of disk 18. Consequently, in order to reduce the angle of refraction of the beam as it passes through disk 18, the beam should pass through disk 18 as far from the center and as close to the periphery thereof as practicable. The beam from laser amplifier 28 and from laser oscillator 10 impinging upon mirror 14 and then upon anamorphic beam-reducing optics 16 has approximately the same cross-sectional area in both vertical and horizontal dimensions. Anamorphic beam-reducing optics 16 reduce the dimension of the cross-sectional area of the beam in the radial direction so that the beam may be concentrated as near the periphery of disk 18 as is possible. This is indicated in FIG. 3 where the cross-sectional area 50 of the beam passing through disk 18 is shown. As can be seen, the radial dimension of this cross-sectional area is much less than the circumferential dimension, in accordance with the principles stated above. In addition, it is preferable that the surface 17 lie along perpendicular radii from the axis of rotation of disk 18. Anamorphic beam-expanding optics 24 transforms the beam from disk 18 back to its original cross-sectional shape for optimum amplification by laser amplifier 28.

Normally, a linear frequency sweep with time is desired and the surface 17 is appropriately configured which is fairly straightforward to accomplish. This should be contrasted with some other methods for chirping a laser output which are square law processes and require more complicated proceedings to produce a linear frequency sweep with time.

In some applications, a steel collar or other means of reducing internal stresses caused by rotation of disk 18 may be required about the periphery thereof.

Figure 2:
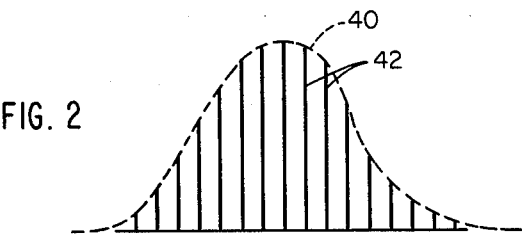
FIG. 2 is an exemplary diagram of the spectral output of a typical injection-locked oscillator.

In explaining the principles behind the operation of the present invention, it is useful to describe the basic characteristics of an injection-locked oscillator. The frequency spectra of the laser pulse emission from an injection-locked oscillator consists of a series of mode lines separated in frequency by the factor C/L, where C is the velocity of light and L is the optical path length around the loop in the injection-locked oscillator. This is shown in FIG. 2 where the frequency spectra of the output beam from a conventional injection-locked oscillator is shown. This output is composed of a plurality of discrete longitudinal mode lines 42 separated in frequency by C/L, as described above. The envelope of the laser emission spectra, shown by dotted line 40, is determined by the bandpass characteristic of the laser amplifying medium 28 and/or other cavity elements of the injection-locked oscillator. The present invention, as shown in FIG. 1, operates to move the line spectra 42 within the envelope 40 so that the entire bandwidth within the envelope 40 is covered by the moving spectral lines. Although it is only necessary to move the line spectra by one factor of C/L to continuously cover the bandwidth, in some applications it may prove advantageous to move the line spectra by several factors of C/L.

The frequency sweep produced by the system of FIG. 1 may be described mathematically using $n$ to denote the index of refraction of the material from which disk 18 is fabricated typically on the order of 1.7; $\omega$ for the angular velocity of the disk in radians per second; $l$ for the thickness of the disk at the center of the beam; and S for the coordinate position of the center of the beam measured along the perimeter of the disk. Typically, anamorphic optics 16 and 24 are chosen such that the beam passing through disk 18 is narrow along the radial direction, and the radial coordinate of the beam is taken as approximately equal to the radius of the disk denoted by $r_o$.

The increment P in equivalent optical path length due to the presence of the optically dense material in disk 18 is given by:

$$P = l(n-1) \tag{1}$$

This path length increases with a change in $l$ by:

$$\Delta P = (n-1)(dl/ds)(ds/dt)\Delta t \tag{2}$$

where $\Delta t$ is the duration of the pulse length. Equation (2) may be further expressed as:

$$\Delta P = (n-1)(dl/ds) r_o \omega \Delta t \tag{3}$$

It is desirable that changes in path length be at rates that are a fraction of a wavelength in the interval for the beam to pass once around the loop (equivalent to a frequency sweep that is a fraction of the distance between mode spectral lines). This is helpful in maintaining lock in the injection-locked oscillator. Thus, since:

$$\Delta f/f = \Delta\lambda/\lambda = \Delta P/L \tag{4}$$

where $\lambda$ equals the wavelength, from equations (3) and (4), the change in output frequency with time may be determined to be:

$$df/dt = (f/L)(dP/dt) = (f/L)(dl/ds) r_o \omega(n-1) \tag{5}$$

The thickness $\omega$ of the step surface 17 on disk 18 is given by:

$$\omega = dl/ds \, r_o 2\pi \tag{6}$$

From equations (5) and (6), the parameters of the system may be determined. To illustrate this, the following example is given. Assume a laser input pulse with a wavelength of 5000 A, which is a frequency of $6 \times 10^{14}$ Hz., and a pulse length of 10 microseconds. If the ILO path length is 300 cm, the mode separation is given by:

$$\Delta f = C/L = 100 \text{ MHz} \tag{7}$$

Assume further, a sweep for the ILO frequency covers 10 mode intervals during each pulse. The sweep rate required is:

$$df/dt = 10 \times 100 \text{ MHz}/10 \text{ } \mu\text{sec} = 10^{14} \text{ Hz/sec} \tag{8}$$

Typical parameters for the rotating disk are: index of refraction, $n = 1.7$; distance of beam from the center, $r_o = 1$ cm.; and angular velocity, $\omega = 2\pi \times 125$ rad/sec ($\sim$7500 rpm).

From equation (5), the value of $dl/ds$ may be determined:

$$\frac{dl}{ds} = \frac{L}{f} \frac{1}{r_o\omega(n-1)} \frac{df}{dt} = 0.091 \tag{9}$$

From equations (6) and (9), the height $\omega$ of the step on disk 18 may be calculated:

$$\omega = (dl/ds) r_o 2\pi = 0.571 \text{ cm} \tag{10}$$

It should be noted that the velocity at the edge of the disk is $\omega r_o$ or about 785 cm/sec. This is less than Mach 0.1 and is an entirely realistic number with current technology.

The time for a single pass of the beam around the ILO loop is L/C or $10^{-8}$ sec. From equation (2), the increase in path length during a single pass is:

$$\Delta P = (n-1)\frac{dl}{ds}\frac{ds}{dt}\Delta t = 5 \times 10^{-7} \text{cm} \tag{11}$$

The increase in path length during one pass is 0.01 $\lambda$, satisfying the condition stated above that the charge in path length be at a rate which is a small fraction of a wavelength in the time required for the beam to pass once around the loop.

It can be seen that while the novel method of sweeping the frequency of radiation from a laser or other source of electromagnetic energy has been described in conjunction with an injection-locked oscillator, this method is equally applicable to other optical-path-length, frequency-dependent sources of radiation. Accordingly, the preferred embodiment described herein is not to be construed as a limitation upon the invention; and the present invention is only to be limited as indicated by the appended claims.

What is claimed is:

1. A method for providing a beam of electromagnetic radiation of time-varying frequency, comprising the steps of:
   providing a beam of electromagnetic radiation from a source thereof;
   circulating the beam of electromagnetic radiation around a closed path to define a set of distinct resonant frequencies for the radiation circulating around said path;
   amplifying the beam of electromagnetic radiation circulating around the path; and
   varying the speed of propagation of the beam of electromagnetic radiation as a function of time over a portion of the path to produce frequency variations in the distinct resonant frequencies in the beam of electromagnetic radiation circulating around the path.

2. The method of claim 1 wherein the step of varying includes the step of passing the beam of electromagnetic radiation circulating around the path through a time-varying thickness of a material having an index of refraction different from that of the surrounding environment.

3. The method of claim 1 wherein:
   the source of electromagnetic radiation provides radiation in a series of pulses; and
   the step of varying the speed of propagation includes cyclically varying the length of the closed path over a range between a predetermined maximum and a predetermined minimum length.

4. The method of claim 1 further including the step of extracting a fraction of the electromagnetic radiation circulating in the closed path.

5. A system for providing electromagnetic radiation of time-varying frequency, comprising:
   an injection-locked oscillator including:
   a source of electromagnetic radiation of substantially fixed frequency;
   means for directing electromagnetic radiation along a closed path;
   means for injecting electromagnetic radiation from the source into the closed path;
   means located in the closed path for amplifying electromagnetic radiation passing therethrough; and
   means for extracting a fraction of the electromagnetic radiation in the closed path to form an output beam; and
   means for varying as a function of time the speed of propagation of electromagnetic radiation over a portion of the closed path.

6. The system of claim 5 wherein the source of electromagnetic radiation includes a pulsed laser for providing time sequential pulses of laser radiation.

7. The system of claim 6 wherein the means for varying includes means for providing a time-varying thickness of a material having an index of refraction different from that of the surrounding environment through which the electromagnetic radiation passes.

8. The system of claim 7 wherein the means for providing includes means for rotating the material about an axis, the thickness of the material being a function of the angular rotation thereof about the axis.

9. The system of claim 8 further including means for synchronizing the rotation of the material with the occurrence of pulses from the pulsed laser such that pulses of electromagnetic radiation pass through the material at predetermined angular positions thereof about the axis.

10. The apparatus of claim 8 wherein the material has a first surface perpendicular to the axis of rotation, and a second surface opposite the first surface which is generally helical in shape, such that the dimension of said material in a direction parallel to the axis of rotation increases from a minimum to a maximum as the material is rotated through a complete revolution about the axis.

11. The system of claim 10 wherein the dimension through the material in a direction parallel with the axis is a linear function of angular rotation.

12. The system of claim 10 wherein the helical surface lies along the perpendicular radii from the axis.

13. Apparatus for providing output pulses of electromagnetic radiation having a time-varying frequency, comprising:
a source of electromagnetic radiation;
refracting means having an index of refraction differing from that of the surrounding environment, the refracting means being of varying thickness; and
means for moving the refracting means so that electromagnetic radiation from the source passes through a time-varying thickness of the refracting means thereby varying the frequency of the radiation.

14. The apparatus of claim 13 wherein the source of electromagnetic radiation includes a laser.

15. The apparatus of claim 13 wherein the means for moving includes means for rotating the refracting means about an axis;
the refracting means having a thickness which varies as a function of the angular position thereof about the axis of rotation.

16. The apparatus of claim 15 wherein:
the source of electromagnetic radiation includes a pulsed laser which produces at least one pulse per complete revolution of the refracting means.

17. The apparatus of claim 16 wherein the source of pulsed laser radiation produces a plurality of pulses during each complete revolution of the refracting means.

18. The apparatus of claim 16 including means for synchronizing the rotation of the refracting means with the occurrence of pulses from the source of electromagnetic radiation such that pulses occur at predetermined, fixed, angular positions in the rotation of the refracting means.

19. The apparatus of claim 15 wherein:
one surface of the refracting means is planar and perpendicular with respect to the axis of rotation;
another surface of the refracting means is a helical surface extending circumferentially about the axis of rotation; and
the electromagnetic radiation passes through the refracting means generally parallel to the axis of rotation and displaced at a distance therefrom.

20. The apparatus of claim 19 wherein the thickness of the refracting means along the path of radiation therethrough is a linear function of the angle of rotation of the refracting means about the rotational axis.

21. The apparatus of claim 19 wherein the helical surface lies along radial lines perpendicular to the axis of rotation.

22. The apparatus of claim 19 wherein the radially outer boundary of the refracting means is surrounded by a collar of a material for reducing stresses induced in the refracting means by rotation thereof.

23. The apparatus of claim 13 wherein the source of electromagnetic radiation includes means for directing electromagnetic radiation in a closed path, said closed path passing through the varying thickness of the refracting means.

24. The apparatus of claim 23 wherein the means for directing electromagnetic radiation in a closed path includes a laser injection-locked oscillator.

* * * * *